United States Patent
Cohen-Solal

(10) Patent No.: US 7,206,029 B2
(45) Date of Patent: Apr. 17, 2007

(54) PICTURE-IN-PICTURE REPOSITIONING AND/OR RESIZING BASED ON VIDEO CONTENT ANALYSIS

(75) Inventor: Eric Cohen-Solal, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1215 days.

(21) Appl. No.: 09/738,650

(22) Filed: Dec. 15, 2000

(65) Prior Publication Data
US 2002/0075407 A1 Jun. 20, 2002

(51) Int. Cl.
H04N 5/45 (2006.01)
H04N 5/445 (2006.01)
H04N 7/08 (2006.01)

(52) U.S. Cl. ............ 348/565; 348/564; 348/566; 348/569; 382/298; 345/629

(58) Field of Classification Search ............ 348/561, 348/564–566, 569, 460, 468, 473, 474; 345/635, 345/705–715, 790–801, 788, 719, 768; 382/181, 382/282, 286, 100; *H04N 5/45, 5/445, 7/08*
See application file for complete search history.

(56) References Cited

U.S. PATENT DOCUMENTS

| | | | |
|---|---|---|---|
| 4,367,484 A * | 1/1983 | Kuroyanagi et al. | 348/566 |
| 4,574,364 A * | 3/1986 | Tabata et al. | 345/798 |
| 5,047,857 A * | 9/1991 | Duffield et al. | 348/553 |
| 5,206,714 A * | 4/1993 | Kim | 348/565 |
| 5,398,074 A * | 3/1995 | Duffield et al. | 348/564 |
| 5,432,560 A | 7/1995 | Ersoz et al. | |
| 5,541,662 A * | 7/1996 | Adams et al. | 348/460 |
| 5,574,507 A * | 11/1996 | Baek | 348/511 |

(Continued)

FOREIGN PATENT DOCUMENTS

DE 19843919 A 3/2000

(Continued)

OTHER PUBLICATIONS

Rowley et al., "Human Face Detection in Visual Scenes", Affiliation: Sch. of Comput. Sci., Carnegie Mellon Univ., 1996, pp. 875-881.

(Continued)

*Primary Examiner*—Brian P. Yenke
(74) *Attorney, Agent, or Firm*—Larry Liberchuk

(57) ABSTRACT

A video display device, such as a television, having a picture-in-picture (PIP) display and a processor. The processor detects cues, such as color/texture/events/behaviors, etc., present in a primary display image, that is overlaid by the PIP. These cues are utilized by the processor to determine important and relatively unimportant portions of the primary display image. The processor then determines whether a change in a display characteristic of the PIP leads to the PIP obscuring less of an important portion of the primary display image, and if so, the processor changes the display characteristic of the PIP. Display characteristics of the PIP that may be changed by the processor include the PIP position, size, and transparency. The processor may also utilize a combination of the detected cues to determine important and relatively unimportant portions of the primary display image. The processor may also change combinations of display characteristics of the PIP.

10 Claims, 5 Drawing Sheets

U.S. PATENT DOCUMENTS

| | | | | |
|---|---|---|---|---|
| 5,589,893 | A * | 12/1996 | Gaughan et al. | 725/37 |
| 5,610,664 | A * | 3/1997 | Bobert | 348/564 |
| 5,654,805 | A | 8/1997 | Boon | |
| 5,760,838 | A * | 6/1998 | Adams et al. | 348/460 |
| 5,903,314 | A | 5/1999 | Niijima et al. | |
| 6,008,860 | A * | 12/1999 | Patton et al. | 348/565 |
| 6,052,155 | A * | 4/2000 | Cherrick et al. | 348/565 |
| 6,088,064 | A * | 7/2000 | Rumreich et al. | 348/564 |
| 6,108,042 | A * | 8/2000 | Adams et al. | 348/460 |
| 6,201,879 | B1 | 3/2001 | Bender et al. | 382/100 |
| 6,311,328 | B1 * | 10/2001 | Miyazaki et al. | 725/37 |
| 6,320,623 | B1 * | 11/2001 | Cavallerano et al. | 348/553 |
| 6,353,450 | B1 * | 3/2002 | DeLeeuw | 345/768 |
| 6,357,045 | B1 * | 3/2002 | Devaney | 725/138 |
| 6,359,657 | B1 * | 3/2002 | Westerink et al. | 348/584 |
| 6,396,543 | B1 * | 5/2002 | Shin et al. | 348/452 |
| 6,473,102 | B1 * | 10/2002 | Rodden et al. | 345/788 |
| 6,473,130 | B1 * | 10/2002 | Kim | 348/565 |
| 6,493,036 | B1 * | 12/2002 | Fernandez | 348/561 |
| 6,493,038 | B1 * | 12/2002 | Singh et al. | 348/565 |
| 6,542,621 | B1 * | 4/2003 | Brill et al. | 382/103 |
| 6,556,252 | B1 * | 4/2003 | Kim | 348/565 |
| 6,556,253 | B1 * | 4/2003 | Megied et al. | 348/565 |
| 6,701,524 | B1 * | 3/2004 | Okamura et al. | 725/37 |
| 6,724,434 | B1 * | 4/2004 | Aaltonen | 348/565 |
| 2001/0040584 | A1 * | 11/2001 | Deleeuw | 345/629 |
| 2002/0069411 | A1 * | 6/2002 | Rainville et al. | 725/37 |
| 2002/0070957 | A1 * | 6/2002 | Trajkovic et al. | 345/719 |
| 2002/0140861 | A1 * | 10/2002 | Janevski et al. | 348/565 |
| 2002/0140862 | A1 * | 10/2002 | Dimitrova et al. | 348/565 |
| 2003/0016304 | A1 * | 1/2003 | Norsworthy et al. | 348/565 |
| 2004/0107438 | A1 * | 6/2004 | Sekiguchi et al. | 725/43 |

FOREIGN PATENT DOCUMENTS

| | | |
|---|---|---|
| GB | 2343945 A | 5/2000 |
| JP | 11328405 | 11/1999 |
| WO | WO-98/55718 * | 12/1998 |

OTHER PUBLICATIONS

Chin et al., "Computer Vision-ACCV '98", Third Asian Conference on Computer Vision, Hong Kong, 1998, Proceedings, vol. 1.

C. Stauffer, "Automatic Hierarchical Classification Using Time-Based Co-Occurrences", IEEE Computer Society Conference on Computer Vision and Pattern Recognition, Jun. 1999.

Lee et al., "Automatic Human Face Location in a Complex Background Using Motion and Color Information", Pattern Recognition, vol. 29, No. 11, Nov. 1996.

Gutta et al., "Face Surveillance", The Institute of Electrical and Electronics Engineers, Inc., Sixth International Conference on Computer Vision.

Patent Abstracts of Japan, Maeda Toshiharu, "Display Controller For Slave Picture," Publication No. 07087392, Mar. 31, 1995, Application No. 05249996, Sep. 9, 1993.

Patent Abstracts of Japan, Ozaki Atsushi, "Picture-In-Picture System," Publication No. 05268543, Oct. 15, 1993, Application No. 04066046, Mar. 24, 1992.

* cited by examiner

PICTURE-IN-PICTURE REPOSITIONING AND/OR RESIZING BASED ON VIDEO CONTENT ANALYSIS

FIELD OF THE INVENTION

This invention generally relates to a method and device to enhance home television usage. Specifically, the present invention relates to a picture-in-picture display that responds to characteristics of underlying video content.

BACKGROUND OF THE INVENTION

It is very common for televisions to have a capability of displaying more than one video display on the television display at the same time. Typically, the display is separated into two or more portions wherein a main portion of the display is dedicated to a first video data stream (e.g., a given television channel). A second video data stream is simultaneously shown in a display box that is shown as an inset over the display of the first data stream. This inset box is typically denoted as a picture-in-picture display ("PIP"). This PIP provides the functionality for a television viewer to monitor two or more video data streams at the same time. This may be desirable for instance at a time when a commercial segment has started on a given television channel and a viewer wishes to "surf" additional selected television channels during the commercial segment, yet does not wish to miss a return from the commercial segment. At other times, a viewer may wish to search for other video content or just view the other content without missing content on another selected channel.

In any event, PIP has a problem in that the PIP is typically shown in an inset box that is overlaid on top of a primary display. The overlaid PIP has the undesirable effect of obscuring a portion of the primary display.

In prior art systems, the PIP may be resized so that the user may decide what size to make the PIP to avoid obscuring portions of the underlying video images. In other systems, a user may move the PIP to preselected or variably selectable portions of the video screen but these systems are unwieldy for a user to operate in real time as the underlying video image changes over time.

In other systems, the PIP may be automatically repositioned to a portion of the primary display in response to detected motion between one frame of the video image and the next frame. However, this system has many drawbacks in that oftentimes, there may be many portions of the screen that have motion, yet there is no system for discerning which portions are more or less important. In addition, many video segments have dialogue portions wherein there is little or no motion, and yet these portions of the video segment may be a primary area of interest in the video segment. In the prior art systems, motion in a background portion of the video segment may cause the PIP to be repositioned over other portions that although, may not have as much relative motion, may still be of relative importance.

Accordingly, it is an object of the present invention to overcome the disadvantages of the prior art.

SUMMARY OF THE INVENTION

The present invention is video display device such as a television having a picture-in-picture (PIP) display and a processor. The processor detects cues, such as color/texture/events/behaviors, etc., present in a primary display image that is overlaid by the PIP. These cues are utilized by the processor to determine important and relatively unimportant portions of the primary display image. The processor then determines whether a change in a display characteristic of the PIP leads to the PIP obscuring less of an important portion of the primary display image, and if so, the processor changes the display characteristic of the PIP. Display characteristics of the PIP that may be changed by the processor include the PIP position, size, and transparency. The processor may also utilize a combination of the detected cues to determine important and relatively unimportant portions of the primary display image. The processor may also change combinations of display characteristics of the PIP.

BRIEF DESCRIPTION OF THE DRAWINGS

The following are descriptions of embodiments of the present invention that when taken in conjunction with the following drawings will demonstrate the above noted features and advantages, as well as further ones. It should be expressly understood that the drawings are included for illustrative purposes and do not represent the scope of the present invention. The invention is best understood in conjunction with the accompanying drawings in which.

DETAILED DESCRIPTION OF THE INVENTION

In the discussion to follow, certain terms will be illustratively discussed in regard to specific embodiments or systems to facilitate the discussion. For example, identified events/behaviors will be described below which represent cues that a processor may utilize to operate in accordance with the present invention. Accordingly, as would be readily apparent to a person of ordinary skill in the art, the term cue/cues should be understood to encompass other similar color/texture/events/behaviors wherein the present invention could be readily applied.

Figure 1:
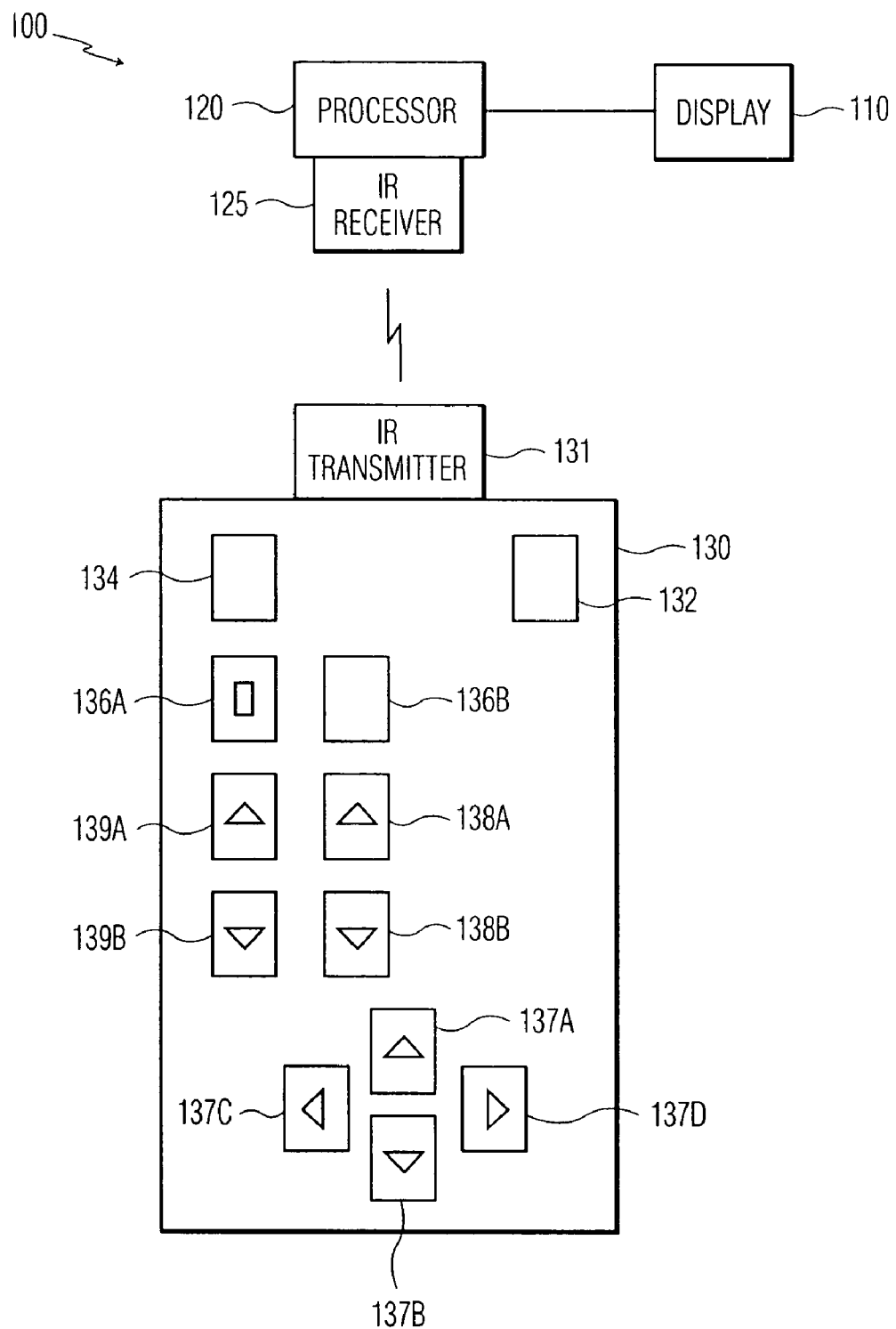
FIG. 1 shows an illustrative system in accordance with an embodiment of the present invention.

FIG. 1 shows an illustrative system 100 in accordance with an embodiment of the present invention including a display 110, operatively coupled to a processor 120, and a remote control device 130. The processor 120 and the remote control device 130 are operatively coupled as is known in the art via an infrared (IR) receiver 125, operatively coupled to the processor 120, and an IR transmitter 131, operatively coupled to the remote control device 130.

The display 110 may be a television receiver or other device enabled to reproduce audiovisual content for a user to view and listen to. The processor 120 is operable to produce a picture-in-picture display (PIP) on the display 110 as is know by a person of ordinary skill in the art. Further, the processor 120 is operable to provide and position a PIP display in accordance with the present invention.

The operation of the illustrative system shown in FIG. 1 will be described herein below with reference to FIGS. 2A, 2B, 2C, and 3. The remote control device 130 contains buttons for operation in accordance with the present invention. Specifically, the remote control device 130 contains a PIP button 134, a swap button 132, an active PIP initiation button 136A, an active PIP mode selection button 136B, and PIP position control buttons 137A, 137B, 137C, 137D. The PIP button 134 initiates a PIP function to open a PIP 210A (e.g., see, FIG. 2A) on the display 110. The swap button 132 swaps each of the images shown on the PIP 210A and on a primary display portion 210B of the display 110. The PIP position control buttons 137A, 137B, 137C, 137D enable a user to manually reposition the PIP 210A over selectable portions of the display 110. The remote control 130 may also contain other control buttons, as is known in the art, such as channel selector keys 139A, 139B and 138A, 138B for selecting the video data streams respectively for the PIP 210A and the primary display 210B.

Further, although the buttons 138A, 138B, 139A, 139B are illustratively shown as channel selector buttons, as would be obvious to a person of ordinary skill in the art, the buttons 138A, 138B, 139A, 139B may also select from amongst a plurality of video data streams from one or more other sources of video. For instance, one source of either video data stream (e.g., the PIP 210A and the primary display area 210B) may be a broadcast video data stream while another source may be a storage device. The storage device may be a tape storage device (e.g., VHS analog tape), a digital storage device such as a hard drive, an optical storage device, etc., or any other type of known device for storing a video data stream. In fact, any source of a video data stream for either of the PIP 210A and the primary display portion 210B may be utilized in accordance with the present invention without deviating from the scope of the present invention.

Figure 2A:
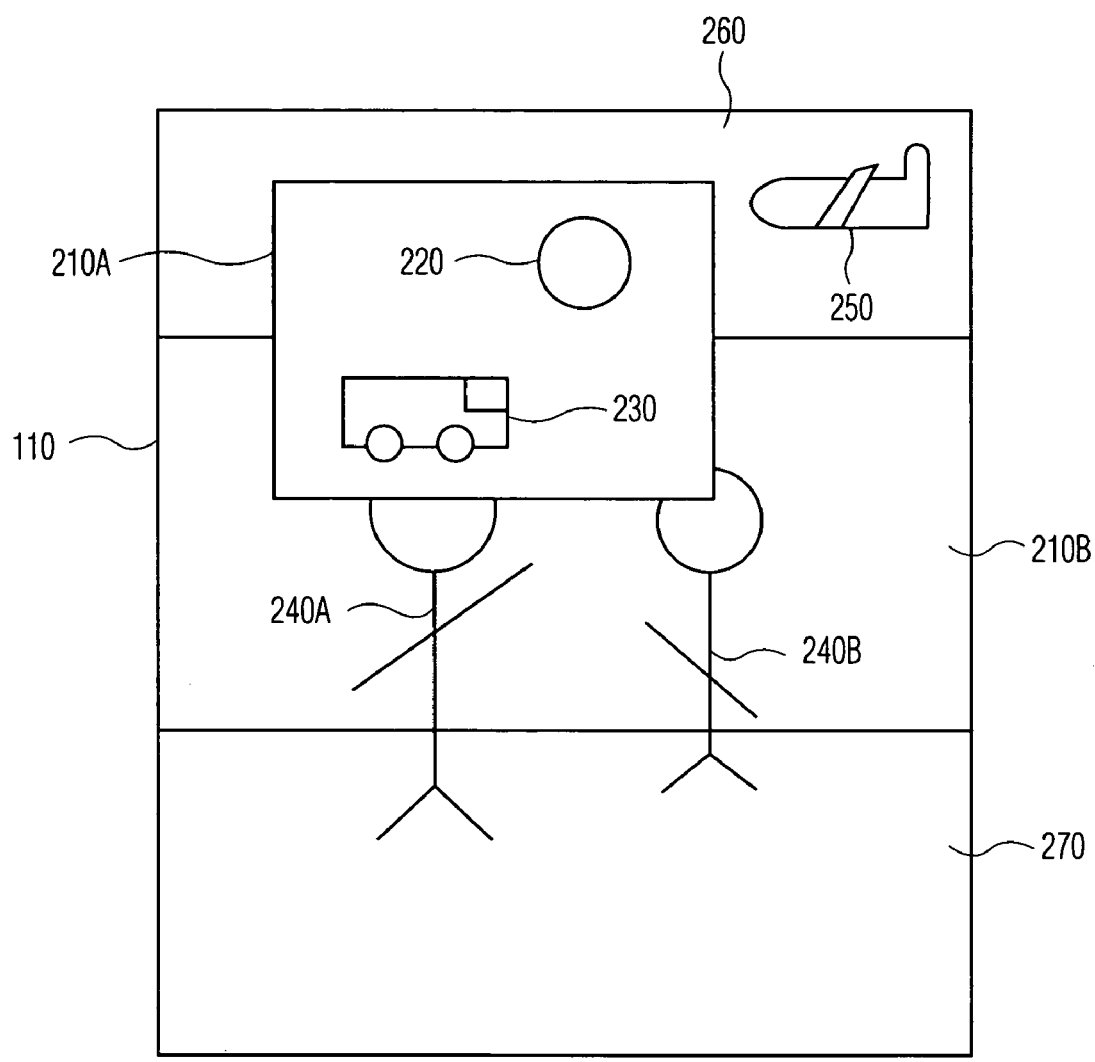
FIG. 2A shows an enlarged view of a display containing illustrative objects in both a PIP and a primary display area.

FIG. 2A shows an enlarged view of the display 110 at an initial time T1. In FIG. 2A, display 110 is shown having a PIP 210A displaying a secondary display image containing illustrative objects such as a sun object 220 and a truck object 230. Further, the display 110 is shown having a primary display portion 210B displaying a primary display image containing illustrative objects including conversing person objects 240A, 240B and a plane object 250. In addition, the primary display area 210B further has a sky region 260 and a road region 270. In the PIP 210A and the primary display portion 210B, only the above objects and regions are shown for the purposes of simplifying the following discussion. It should be expressly understood that although the present invention is described with regard to the shown objects, a person of ordinary skill in the art would readily appreciate that other picture elements may be to rendered within either one or both of the display portions and still be well within the bounds of the present invention.

Figure 2B:
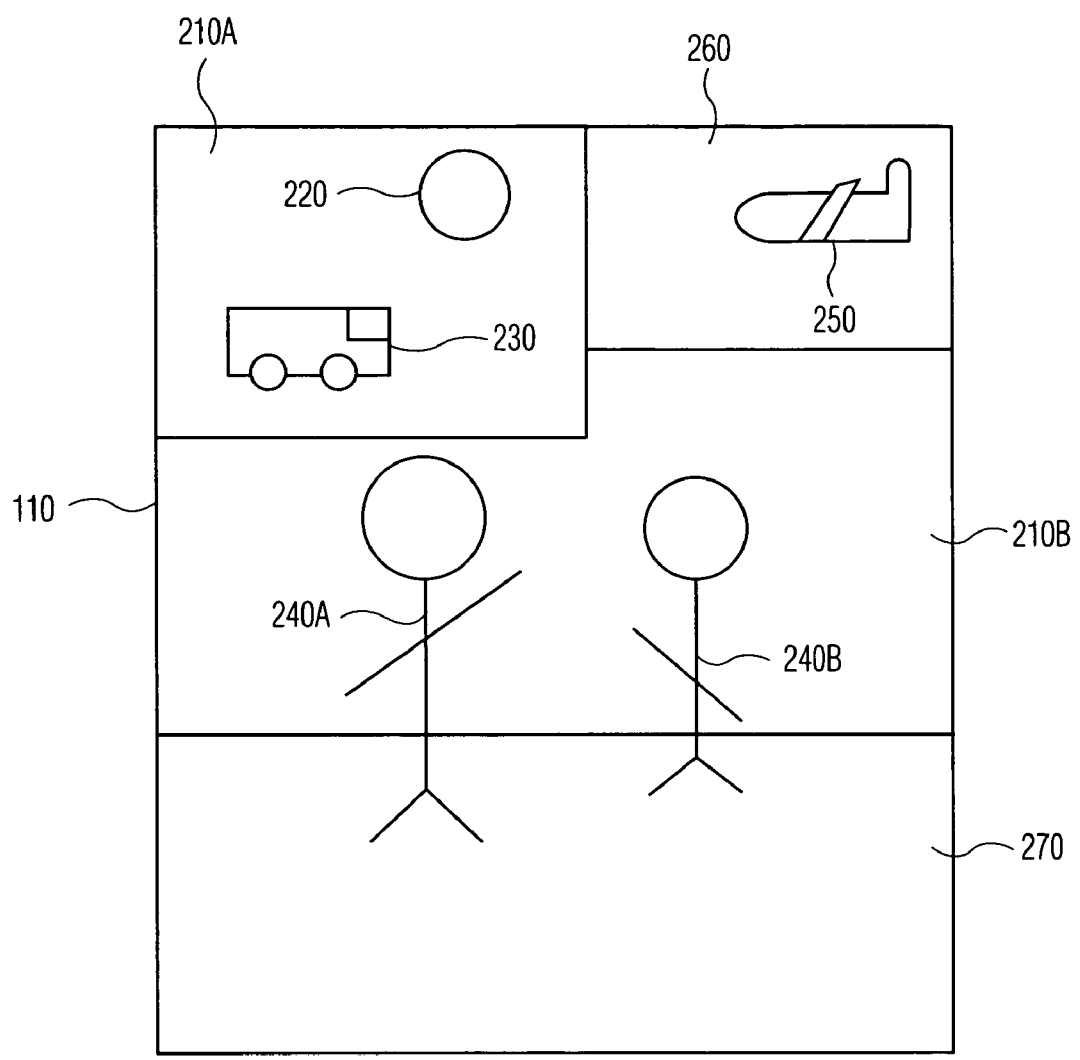
FIG. 2B shows an enlarged view of a display containing illustrative objects in both a repositioned PIP and a primary display area in accordance with an embodiment of the present invention.

In FIG. 2A, the secondary video image in PIP 210A is shown obscuring the conversing person objects 240A, 240B of the primary display image. FIG. 2B shows an enlarged view of the display 110 at some time T2 subsequent to time T1 and sometime after a user has depressed the active PIP initiation button 136A. As shown in FIG. 2B, the PIP 210A has been automatically repositioned with regard to the underlying primary display image on the primary display 210B. The processor 120, operating in accordance with the present invention, performs this automatic repositioning of the PIP 210A.

Figure 2C:
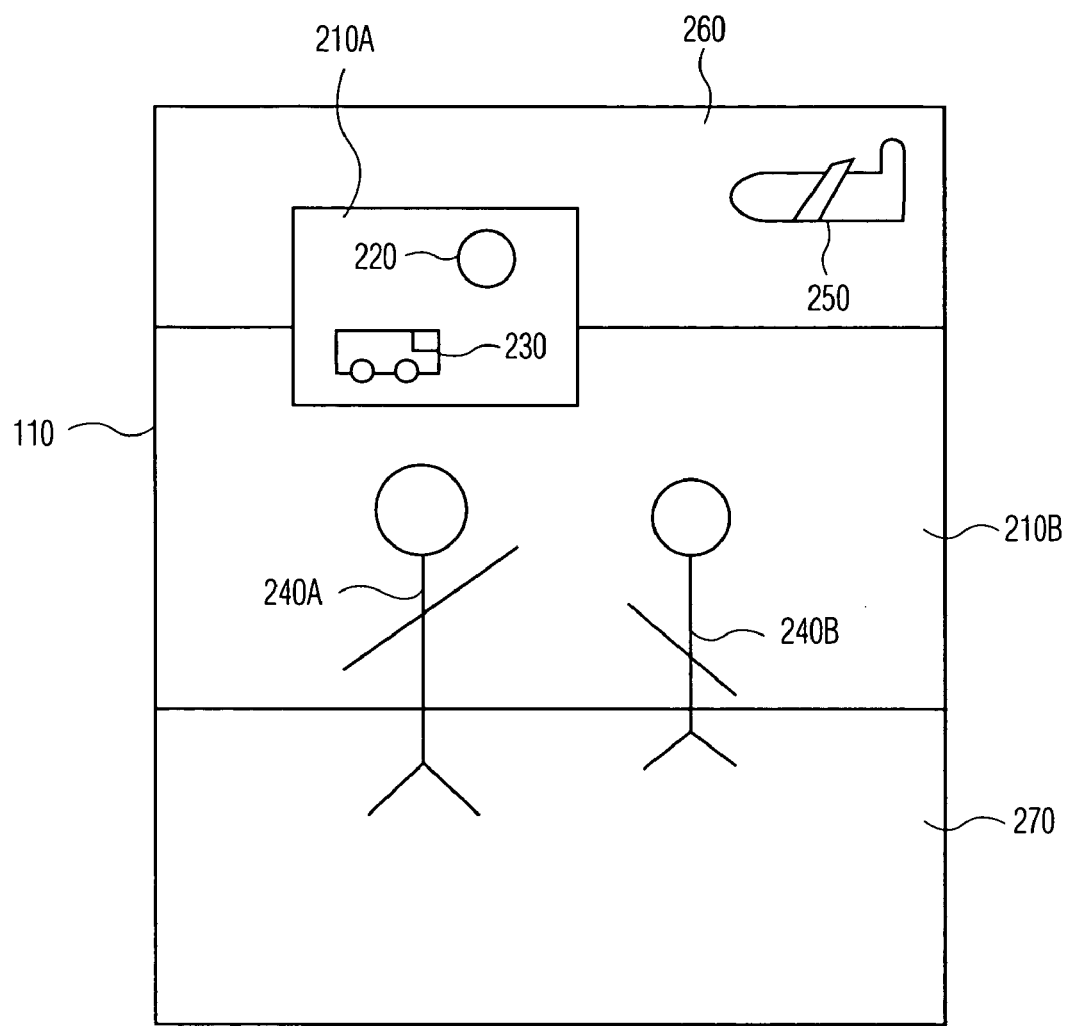
FIG. 2C shows an enlarged view of a display containing illustrative objects in both a resized PIP and a primary display area in accordance with an embodiment of the present invention.

FIG. 2C illustrates operation of the current invention in accordance with another embodiment of the present invention at some time T3 subsequent to time T1. In FIG. 2C, the processor 120 resizes the PIP 210A in response to detecting that the PIP 210A is obscuring a significant portion of an underlying primary display image, for example as shown in FIG. 2A. As would be readily apparent to a person of ordinary skill in the art, the processor 120 may perform either or both of reposition and resize the PIP 210A in response to the user depressing the active PIP initiation button 136A in accordance with the present invention. Further, the PIP 210A will continuously be repositioned by the processor 120 thereafter until the user deselects the active PIP feature by again depressing the active PIP initiation button 136A as further described herein below.

Figure 3:
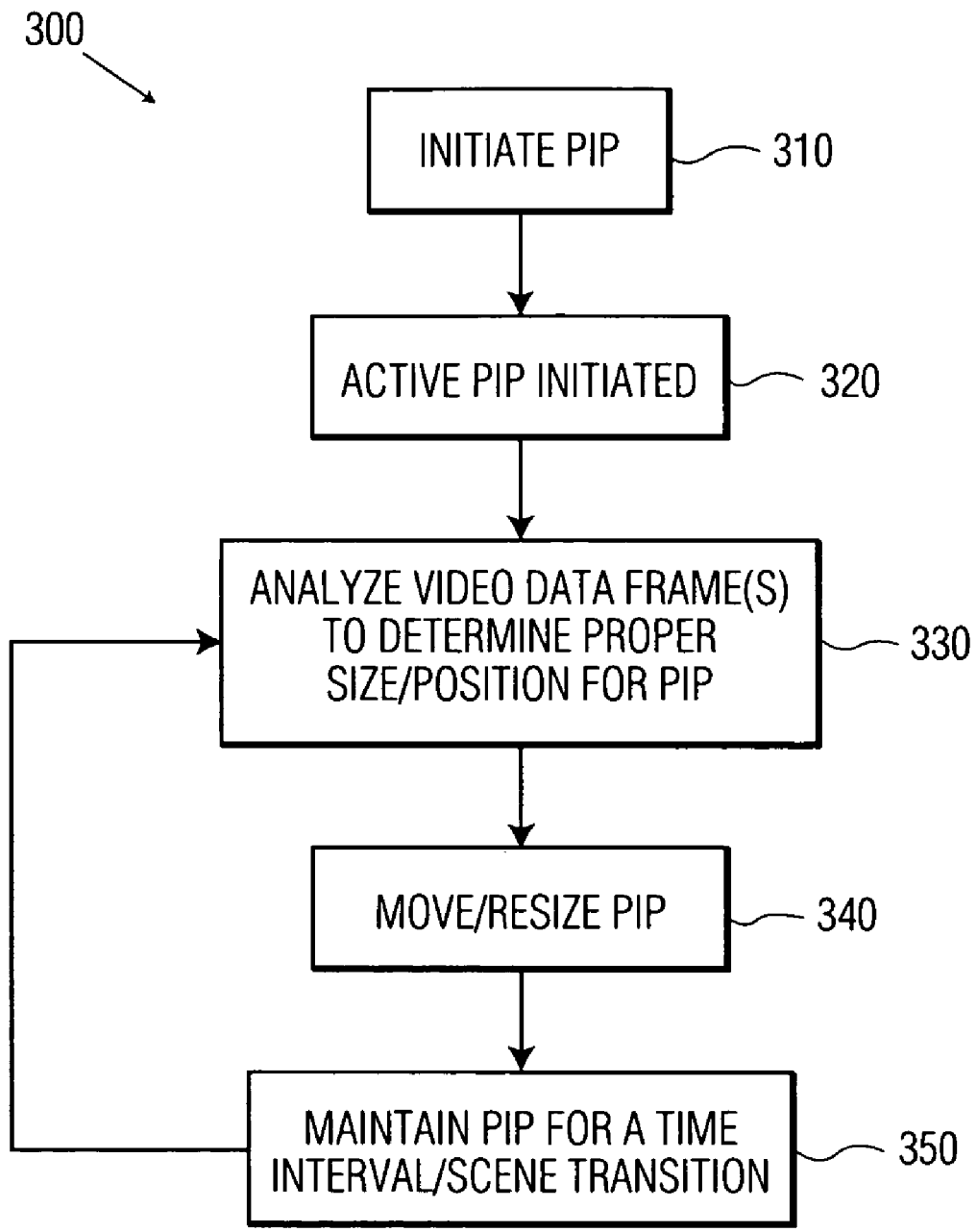
FIG. 3 shows a flow diagram illustrating an operation in accordance with an embodiment of the present invention.

Operation of the present invention will be further described herein with regard to FIG. 3, which shows a flow diagram 300 in accordance with an embodiment of the present invention. As illustrated in the flow diagram in FIG. 3, during act 310, a user initiates a PIP, for example, by depression of the PIP button 134. In one embodiment of the present invention, the PIP that is initiated by the PIP button 134 is a conventional PIP and thereby, may obscure a portion of an underlying video image, for example as shown in FIG. 2A. Thereafter, during act 320, the user depresses the active PIP initiation button 136A, thereby initiating an active PIP (feature) in accordance with the present invention as described further herein below. It should be noted that in other embodiments, the active PIP may be automatically initiated by depression of the PIP button 134 (e.g., during act 310, as a default PIP) or may operate as a function of multiple depressions of the PIP button 134.

In any event, after the active PIP is initiated, in act 330 the processor 120 analyzes the incoming video data stream that is selected for the underlying primary display image (the first video data stream). The processor analyzes the first video data stream for a cue or cues to determine portions that may be important or unimportant to a viewer. In one embodiment in accordance with the present invention, the processor 120 may analyze one or more individual frames of the first video data stream to find a cue or cues, such as areas of the video image that have a continuous color or texture. These areas of continuous color or texture may be representative of a background portion of the video image such as a sky, ground, roadway, wall, etc., portion that typically may not be of central importance in the video image, or in other words, may be relatively unimportant.

There are many known ways in the prior art for detecting these cues. For example, in "The Image Processing Handbook" by John C. Russ, incorporated herein by reference, there are many techniques described for detecting continuous color/texture portions of a video image. In addition, in the Computer Vision Third Asian Conference on Computer Vision Proceedings, Vol. 1, pages 607–614, entitled "Segmentation and Tracking Using Color Mixture Models", incorporated herein by reference, describes methods of using color mixture models for differentiating between background (e.g., unimportant) and foreground (e.g., important) scenes. These above methods are only a couple of the known methods, also called segmentation methods, which refer to the ability to segment a video image based on these detected continuous colors/textures. The processor 120, in accordance with the present invention, may suitably utilize any of those known methods, as well as any other known methods, to identify cues and thereby, determine a suitable position and/or size of the PIP 210A depending on the active PIP mode selected.

After the processor 120 has finished analyzing the first video data stream and identifies portions of the primary display image that are relatively important/unimportant, the processor 120 determines a suitable position and/or size for the PIP 210A. Thereafter, in act 340, the processor 120 repositions and/or resizes the PIP as shown in either of FIGS. 2B, 2C.

When the user has selected a mode wherein the PIP 210A may only be repositioned, as determined by the user's selection by depressing the PIP mode selection button 136B, the processor 120 will determine the most appropriate position for the PIP 210A to overlay the primary display image 210B. The possible positions for the PIP 210A may be variable over any portion of the display 110 or there may be two or more predetermined positions that the processor 120 may select among. Typically, a suitable position for the PIP 210A would be somewhere around the outer edge of the display 110.

When the user has selected a mode wherein the PIP can only be resized, the processor 120 will determine a suitable size for the PIP 210A to overlay the primary display image 210B. The possible sizes for the PIP 210A may be amongst two or more sizes and may be determined by the processor 120 as a function of the content of the primary display image that is being overlaid by the PIP 210A. When the user has selected a mode wherein the PIP 210A can be both repositioned and resized, the processor 120 will determine a suitable position and size for the PIP 210A to overlay the primary display image 210B. In this case, the processor 120 will determine the suitable size for the PIP 210A based on the size of the area that the processor 120 has determined is available.

In a case wherein the suitable position has a large area of non-critical content, the processor 120 will select a large size for the PIP 210A. In a case wherein the suitable position has only a small area of non-critical content, the processor 120 will select a small size for the PIP 210A. In a case wherein there are more potential sizes for the PIP 210A, the processor 120 may select other sizes for the PIP 210A, as determined based on the size of the area of the non-critical content.

Once the PIP 210A has been repositioned and/or resized, thereafter in act 350, the processor 120 will maintain the PIP 210A in that position and/or size for a time interval. This time interval will help avoid an undesirable result of having the PIP 210A be repositioned and/or resized too frequently to enable the user to watch the PIP 210A or the primary display area 210B. In one embodiment, the processor 120 may wait a predetermined interval of time before returning to act 330. In other embodiments, the processor 120 may wait until it is determined that a scene transition or other change has occurred in the primary display image. There are many ways known in the prior art for determining when events, such as a scene transition have occurred in a video data stream. For example, the processor 120 may determine a change in the relative motion present in the images of the video data stream, such as when a movie transitions from an action sequence to a talking sequence. Alternatively, the processor 120 may detect a black frame between frames of the video data stream as oftentimes is inserted between scene transitions. These and any other known methods may be utilized by the processor 120 for determining a suitable time for returning to act 330.

Finally, the above-discussion is intended to be merely illustrative of the present invention. Numerous alternative embodiments may be devised by those having ordinary skill in the art without departing from the spirit and scope of the following claims. For example, although the processor 120 is shown separate from the display 110, clearly both may be combined in a single display device such as a television. In addition, the processor may be a dedicated processor for performing in accordance with the present invention or may be a general purpose processor wherein only one of many functions operate for performing in accordance with the present invention. In addition, the processor may operate utilizing a program portion or may be a hardware device utilizing a dedicated or multipurpose integrated circuit.

In addition, although the processor is illustratively described detecting cues such as continuous color or texture portions of the first video data stream, these are only some cues that may be detectable in the first video data stream and that may be utilized by the processor in accordance with the present invention. For example, in a video sequence, such as a movie, a person or people oftentimes occupy the important user attention area of the video sequence. Accordingly, the processor may also detect a person or people present in the primary video display image as a cue, and thereafter, reposition and/or resize the PIP to not obstruct the person or people. In the prior art, there are many known methods of detecting cues such as people, faces, human body forms, etc., that may by suitably utilized by the processor to operate in accordance with the present invention.

In other embodiments, the processor operating in accordance with the present invention may detect other cues such as specific behaviors and/or events that are typically present in given video sequences. For example, European Patent WO9932959 entitled, "Method and System for Gesture Based Option Selection" incorporated herein by reference, shows methods of detecting a head of a person for the purposes of identifying the presence of a person in a video image. U.S. Patent application Ser. No. 09/603,532 entitled "Method and Apparatus for Tuning the Content of Information Presented to an Audience, incorporated herein by reference, shows methods of detecting information about people and audiences to tune the content of a display. Articles, including, in Proceeding of the 1998 IEEE International Conference on Image Processing, pages 127–130, Vol. 1, entitled "Detecting Human Faces in Color Images"; in Computer Vision and Pattern Recognition Second Workshop of Video Surveillance, entitled "Hydra: Multiple People Detection and Tracking Using Silhouettes"; in Sixth International Conference on Computer Vision, pages 646–651, entitled "Face Surveillance"; in Pattern Recognition The Journal of the Pattern Recognition Society, Volume 29, number 11, pages 1877–1889, entitled "Automatic Human Face Location in a Complex Background Using Motion and Color Information"; and in IEEE Computer Society Conference on Computer Vision and Pattern Recognition, Volume 2, pages 333–339, entitled "Automatic Hierarchical Classification Using Time-Based Co-Occurrences", all incorporated herein by reference thereto, illustrate just a few of the ways that are known in the art for cues that may be utilized by the processor for operation in accordance with the present invention.

Once these specific behaviors are detected, the processor may reposition and/or resize the PIP to not obscure these behaviors and/or events. For example, in the image shown in FIG. 2A on the display 110, there are conversing person objects 240A, 240B and the plane object 250 in the primary video display image. In an image, such as the image shown in FIG. 2A, oftentimes the area of primary interest is the conversing person objects 240A, 240B and not the plane object 250, which may be just occurring in the background of the image. In this case, the processor may utilize known image classifying techniques to identify and differentiate the conversing person objects 240A, 240B from the plane object 250. Thereafter, in a case wherein no other portion of the image is suitable, the processor may determine to cover the plane object 250 with the PIP.

During sporting image sequences, the portion of the images where the players are located is typically the area of importance. Problematically, in these sequences there are also typically audience persons present. In this case, the processor may utilize known shape-based techniques as cues to detect certain human shapes (e.g., the players) as areas of importance, but disregard other human shapes (e.g., the audience). Oftentimes, it is possible to identify important and generic events/behaviors for many types of video sequences such as sports video sequences, news video sequences, action video sequences, etc. Much work has been performed in the prior art for identifying these cues to identify events and/or behaviors, and may utilized by the processor operating in accordance with the present invention.

In addition, in the above described embodiments or other embodiments, the processor may utilize combinations of the above described cues to determine which portions of the primary video image are important and unimportant. Clearly, important portions should not be obscured by the PIP, and unimportant portions may be obscured by the PIP. For example, for a sporting event, the processor may utilize person detection together with the relative size of detected persons (e.g., players verse audience) and/or relative motion of detected persons to determine the important portions of the primary video image. Clearly, any two or more combinations of the above described cues may be utilized by the processor for operation in accordance with the present invention.

Further, although the above invention is illustratively described with regard to altering the position or size of the PIP, clearly other PIP display characteristics may be altered for operation in accordance with the present invention. For example, U.S. patent application Ser. No. 09/734,778, incorporated herein by reference, shows and describes methods of rendering a PIP transparent. Clearly, in response to the processor detecting that an important portion of the primary display image is obscured by the PIP, the processor may determine to render the PIP transparent in response to determining that there are no other suitable positions and/or sizes for the PIP. This mode of operation may be selected exclusively or in combination with PIP reposition and/or resizing by the user appropriate selection utilizing the active PIP mode selection button 136B shown in FIG. 1.

Also, although the above invention is described above with regard to a PIP on a television display, the present invention may be suitably utilized with any display device that has the ability to display a primary image and a PIP including a computer monitor or any other known display device.

The claimed invention is:

1. A video display device comprising:
a display configured to display a primary image and a picture-in-picture image (PIP) overlaying the primary image; and
a processor operatively coupled to the display and configured to receive a first video data stream for the primary image, to receive a second video data stream for the PIP, and to change a PIP display characteristic in response to at least one characteristic present in the primary image,
wherein the PIP display characteristic is at least one of a position of the PIP on the display, a display size of the PIP, and a transparency of the PIP;
said processor being configured to determine that the at least one characteristic is present in the primary image, the characteristic being at least one of a continuous color portion and a continuous texture portion.

2. The video display device of claim 1, wherein said processor is configured to position the PIP on at least one of the continuous color portion and the continuous texture portion after determination of the presence of the characteristic present in the primary image.

3. The video display device of claim 1, wherein said processor is configured to position the PIP so as to minimize overlaying of the PIP with respect to a person image on the at least one frame after determination of the presence of the characteristic present in the primary image.

4. The video display device of claim 1, wherein processor is configured to analyze at least one frame of the first video data stream and determine whether there is a person image present in the at least one frame and at least one of a continuous color portion and a continuous texture portion as the characteristic present in the primary image.

5. The video display device of claim 1, wherein processor is configured to analyze at least one frame of the first video data stream and determine a behavior present on the at least one frame as the characteristic present in the primary image.

6. The video display device of claim 1, wherein the PIP display characteristic is a position of the PIP, and wherein the processor is configured to reposition the PIP to minimize overlaying a portion of the primary image when the characteristic is present in the primary image.

7. The video display device of claim 1, wherein the PIP display characteristic is a size of the PIP, and wherein the processor is configured to resize the PIP to minimize overlaying a portion of the primary image when the characteristic is present in the primary image.

8. The video display device of claim 1, wherein the PIP display characteristic is a transparency of the PIP, and wherein the processor is configured to render the PIP transparent to transparently overlay a portion of the primary image when the characteristic is present in the primary image.

9. The video display device of claim 1, wherein the PIP display characteristic is a size and a position of the PIP, and wherein the processor is configured to determine the size and the position of the PIP to minimize overlaying a portion of the primary image when the characteristic is present in the primary image.

10. The video display device of claim 1, wherein the video display device is a television.

* * * * *